(12) United States Patent
Qiu et al.

(10) Patent No.: US 6,909,820 B2
(45) Date of Patent: Jun. 21, 2005

(54) 2×2 FIBER OPTIC SWITCH WITH REFLECTIVE ELEMENT

(75) Inventors: Wei Qiu, Gardena, CA (US); Zhanxiang Zhang, San Jose, CA (US); Jianmin Gao, San Jose, CA (US); Dong Xu, San Jose, CA (US)

(73) Assignee: Rainbow Communications, Inc., San Jose, CA (US)

( * ) Notice: Subject to any disclaimer, the term of this patent is extended or adjusted under 35 U.S.C. 154(b) by 231 days.

(21) Appl. No.: 10/290,061

(22) Filed: Nov. 6, 2002

(65) Prior Publication Data

US 2004/0086219 A1 May 6, 2004

(51) Int. Cl.⁷ .............................................. G02B 6/26
(52) U.S. Cl. ........................................ 385/21; 385/18
(58) Field of Search .................................... 385/16–23

(56) References Cited

U.S. PATENT DOCUMENTS

| | | | |
|---|---|---|---|
| 5,742,712 A | 4/1998 | Pan et al. | 385/18 |
| 2002/0094172 A1 * | 7/2002 | Brun et al. | 385/78 |
| 2003/0072520 A1 * | 4/2003 | Wu et al. | 385/18 |
| 2003/0081885 A1 * | 5/2003 | Chen et al. | 385/18 |
| 2003/0117684 A1 * | 6/2003 | Chen et al. | 359/290 |
| 2003/0198431 A1 * | 10/2003 | Chen et al. | 385/21 |

FOREIGN PATENT DOCUMENTS

| | | | | |
|---|---|---|---|---|
| DE | 3608135 A1 * | 9/1987 | | G02B/6/26 |
| JP | 2003029174 A * | 1/2003 | | G02B/26/08 |

* cited by examiner

Primary Examiner—Ellen E. Kim
(74) Attorney, Agent, or Firm—Lumen Intellectual Property Services, Inc.

(57) ABSTRACT

A planar 2×2 switch is provided for controllably coupling first and second input channels to first and second output channels. The switch includes a first reflector that is movable between a first position and a second position. When the first reflector is in its second position, it reflects light from the first input channel to the second output channel and reflects light from the second input channel to the first output channel. When the first reflection is in its first position, it does not affect the optical beams in the switch. Instead, these beams are reflected by a second reflector which has two reflective surfaces. The second reflector reflects light from the first input channel to the first output channel and reflects light from the second input channel to the second output channel. Switches having a larger number of input and output channels are also provided.

3 Claims, 8 Drawing Sheets

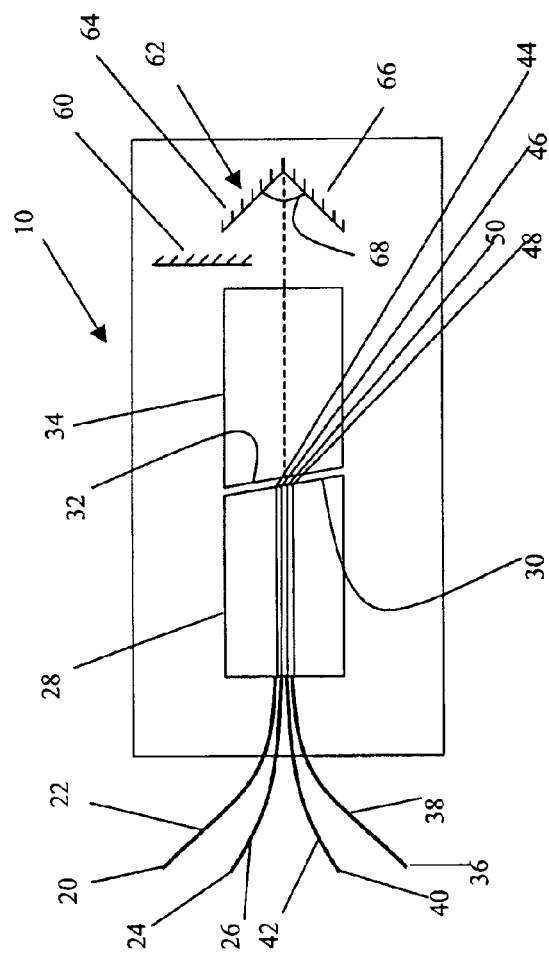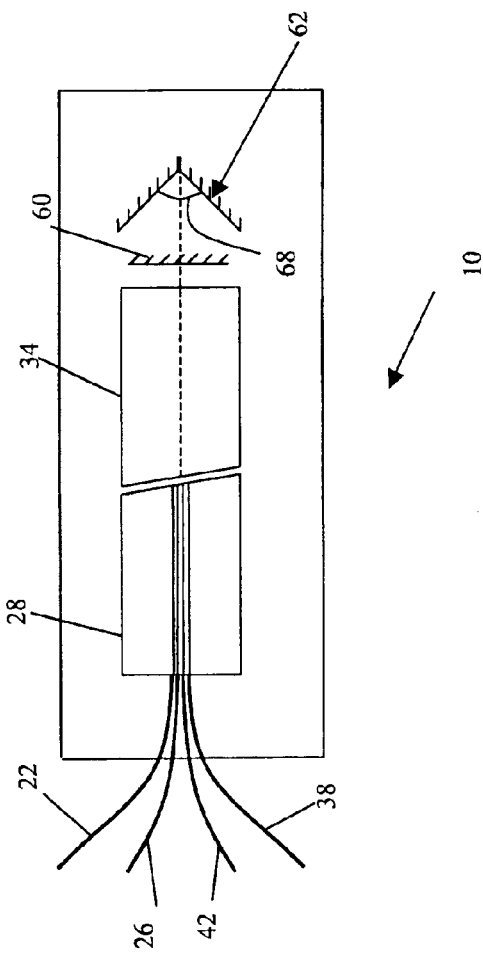
FIG 1A
FIG 1B

2×2 FIBER OPTIC SWITCH WITH REFLECTIVE ELEMENT

FIELD OF THE INVENTION

The present invention relates to the field of fiber optic communication networks. In particular the present invention provides a switching mechanism for directing optical signals along selected fibers of an optical network.

BACKGROUND OF THE INVENTION

Currently, the communications and networking industries utilize optical fibers that are single mode fibers, very small in cross-section, and typically have a fairly narrow acceptance angle within which light entering the fiber must fall to promote efficient propagation of the light along the fiber. Therefore, optical switches which accept light from an input optical fiber, and selectively couples that light to any of a plurality of output optical fibers must transfer that light with precise alignment. The alignment requirements of modern single mode optical fibers are particularly stringent, as their core diameters are typically as small as around 8 micrometers.

In electromechanical 2×2 optical switches, the switching operation is typically effected by the movement of a double-side mirror to couple input light into the ends of each of two output optical fibers, with an optical lens utilized to expand and collimate light from the fibers. To form two optical paths in a 2×2 optical switch, the collimated light beam from the input fibers must accurately align with output collimators to avoid excessive loss of the signal therebetween. This alignment requires a two angle/two position matching operation to occur between input collimators and output collimators.

In addition, in a 2×2 optical switch based on a double-side mirror, each side of the mirror provides for one optical path. This requires additional accuracy to ensure that the optical paths between the two sides of the mirror are parallel to one another. It tremendously increases the cost and complexity for this special mirror and makes it inherently very difficulty to manufacture such a 2×2 optical switch. Another disadvantage of this kind of 2×2 optical switch is the need for at least two collimating lenses, which adds to the bulkiness of the overall package.

U.S. Pat. No. 5,742,712 describes a 2×2 optical switch arrangement in which the optical fibers are housed in a sleeve, the sleeve having a central aperture, which can be circular or square, in which the four fibers of the 2×2 switch arrangement are housed. The fibers are maintained in close proximity to one another, the optical axis of each fiber being at a substantially constant distance from the longitudinal axis of the sleeve itself. Hence, the architecture provides for a somewhat bulky arrangement.

In addition, if this type of architecture were expanded to accommodate a 4×4 switch arrangement, the addition of further fibers would add significantly to the bulkiness of the device, since the additional fibers would need to be accommodated such that their cores were also constant distance from the longitudinal axis of the sleeve, thereby adding to the radial dimension of the sleeve.

OBJECTS AND ADVANTAGES

The present invention provides an improved optical switch in which highly precise double-side mirrors are not required, and the optical fibers and optical pathways do not need to move. The switches of the present invention generally rely on a combination of a fixed reflective element, a moveable reflective element and only one fixed collimating lens. The collimating lens typically expands the optical signal from a single mode fiber to a substantially larger optical path.

When the movable reflective element is disposed out of the optical path, the optical signals from the input optical fibers propagate onto the fixed reflective element, where the signals are reflected such that the first input signal is reflected into the first output fiber, and the second input signal in reflected into the second output fiber. However, when the movable reflective element is disposed within the optical path from the collimating lens, the optical signals from the input fibers are reflected back through that same collimating lens into the output fibers. Hence the first input signal is reflected into the second output fiber and the second input signal is reflected into the first output fiber. The moveable reflective element can move into or across the optical path without changing the position of the input or output fibers relative to each other. A thin planar reflector such as a movable reflective element which is aligned to reflect one of a pair of signals can also reflect the other of a pair of signals as long as they are placed symmetrically to the lens axis. The fixed reflective element, that includes of two planar reflectors which are aligned to reflect one of a pair of signals from two fibers, is placed asymmetrically with respect to the lens axis such that it also reflects another pair of signals, thereby providing highly efficient multiple signal switching. Hence, by carefully locating a number of optical fibers parallel to each other about the longitudinal axis of the collimating lens, a wide variety of highly efficient, multiple input and multiple output switching structures can be constructed.

The present invention also provides for an planar array of optical fibers to be utilized in a switching architecture, thereby reducing the overall bulkiness of the device, and easing manufacturing issues.

SUMMARY OF THE INVENTION

In a first aspect, the present invention provides a 2×2 switch for controllably coupling optical channels, the 2×2 optical switch includes a first input optical channel, a second input optical channel, a first output optical channel and a second output optical channel. A collimating means is disposed in the path of the optical signal from the first and second input channels. A reflector is movable between a first and a second position. The reflector in a first position is disposed in the path of the optical signal from the collimating means, and is aligned to reflect that optical signal back through the same collimating means and into an output channel. The optical signal from the first input channel is coupled into the second output fiber. The optical signal from second input fiber is coupled into first output fiber. The reflector in the second position is disposed out of the path of the input optical signal so that the input optical signal from the collimating means propagates to a second reflector and is reflected back through the same collimating means and into the output fiber. The reflection direction from the second reflector introduces a double reflection by utilizing two planar reflectors, the first reflector does not utilize this double reflection concept. The optical signal from the first input channel is reflected into the first output channel. The optical signal from the second input channel is coupled into the second output channel.

Another aspect of the invention provides for a planar array optical fiber configuration to be utilized in the switching arrangement.

In yet another aspect, the present invention provides dual 2×2 optical switch for controllably coupling four input optical fibers to four output optical fibers.

These and other objects and advantages will become more apparent after consideration of the ensuing description and the accompanying drawings.

BRIEF DESCRIPTION OF THE DRAWINGS

FIGS. 1A and 1B schematically illustrate an electromechanical 2×2 switch according to an embodiment of the present invention;

DESCRIPTION

Figure 2:
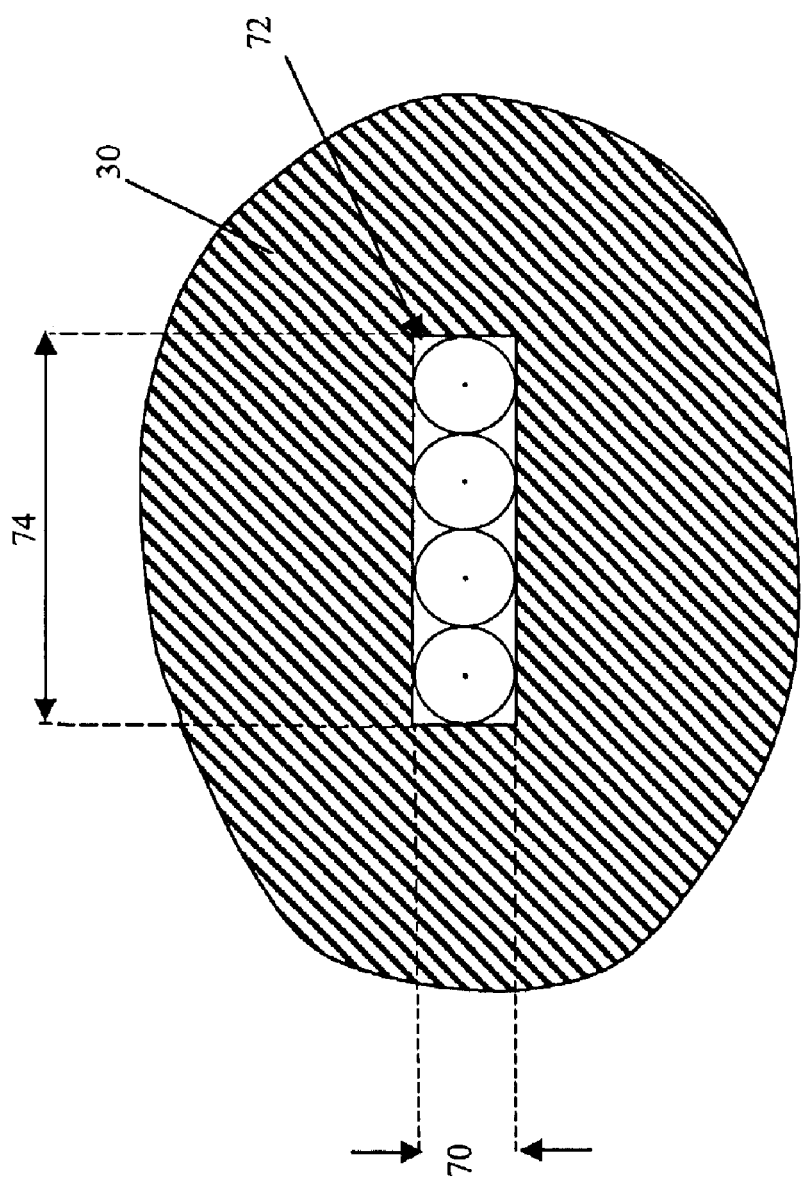
FIG. 2 illustrates the planar array arrangement of optical fibers within a retainer of the electromechanical optical switch of FIGS. 1A and 1B.

FIGS. 1A and 1B illustrate cross-sectional views of a 2×2 electromagnetic switch 10 according to an embodiment of the present invention. The optical switch 10 is shown to include several major components, a multiple of optical channels 22, 26, 38, and 42, a collimating means 34, a first reflector 60, a second reflector 62, and an actuator (not shown) capable of moving the first reflector 60 between at least two predefined positions with respect to the optical channels.

Referring to FIG. 1A, optical signals enter the input end 20 of the first input channel 22 and the input end 24 of the second input optical channel 26. In the preferred embodiment, both input channels are optical fibers which are disposed in a retainer 28, for example a glass sleeve, an element that is known in the art. It can be appreciated by those skilled in the art that various other types of input channels may be used, such as planar waveguides formed on monolithic substrate for example.

The retainer 28 has an end face 30 that is angled with respect to the longitudinal axis of the retainer 28, and in close proximity to the reciprocally angled face 32 of the collimating means 34, preferably a quarter pitch GRIN (GRaded INdex) lens. The optical signals exit the 2×2 electromagnetic switch 10 via the output end 36 of the first output optical fiber 38 and the output end 40 of the second output optical fiber 42. The output ends 44 and 46 of the first and second input optical fibers respectively are substantially flush with the angled end face 30 of the retainer 28. Similarly, the input ends 48 and 50 of the and two output fibers 38 and 42 respectively, are substantially flush with the angled end face 30 of the retainer 28. Both the input ends 44, 46 and the output ends 48, 50 of the input and output optical fibers respectfully are unjacketed. The core and cladding of each fiber is therefore exposed.

FIG. 1A illustrates the 2×2 switch disposed such that the actuator, which is mechanically coupled to the first reflector 60, has positioned the first reflector in a first of at least two predefined positions. This first position ensures that the first reflector 60 is clear of the optical path between the collimating means 34 and second reflector 62. Preferably, the second reflector 62 is a fixed reflector, where "fixed" means that it maintains a substantially constant physical location.

The second reflector 62, preferably comprises two reflective segments 64 and 66. It will be apparent that the two reflective segments may be distinct segments in close proximity to one another, or the two reflective segments may be formed from one piece of material, bent to provide the appearance of two segments, one at an angle to the other. The two segments form a predetermined angle 68, slightly less than 90-degrees, therebetween. Preferably, the axis of the collimating means 34 substantially equally divides the predetermined angle 68 into two.

FIG. 1B illustrates the 2×2 switch disposed such that the first reflector 60, is substantially directly in the optical path between the collimating means 34 and second reflector 62. The first reflector 60 preferably comprises one substantially flat one-sided mirror, as is well known in the art.

FIG. 2 is a schematic cross-sectional end view of the angled output end 30 of the retainer 28. In this example, the output ends of the input fibers and the input ends of the output fibers are untapered, hence, the cross-sectional diameter of each of these single mode fibers is typically about 125 microns. The width 70 of the output slot 72 which in is on the angled face of the retainer 28 is about 125 microns, which just allows standard fiber to go through it. The length 74 of the output slot 72 is about 500 microns, which is able to accommodate four fibers (22, 26, 38, and 42) adjacent one another.

When the first reflector 60 is not in the optical path between the collimating means 34 and the second reflector 62, as illustrated in FIG. 1A, light from the output 44 of the first input fiber 22 is collimated by the collimating means 34. The collimated light propagates with a slight angle relative to the longitudinal axis of the collimating means 34. This collimated light propagates until it reaches the second reflector 62 where it is substantially reflected by a first reflective segment 66, for example a substantially flat mirror. This reflected collimated light propagates to the second reflective segment 64, for example another substantially flat mirror, where it is reflected once again and then propagates to the collimating means 34. The reflected back collimated light which is propagating at an angle relative to the longitudinal axis of the collimating means 34 is refocused by the same collimating means 34 to the input end 50 of the first output fiber 42.

Similarly, light from the second input fiber 26 is collimated and expanded by the same collimating means 34. The collimated light has a slight angle relative to the longitudinal axis of the collimating means 34. This collimated light propagates until it reaches the second reflector 62 where it is substantially reflected by the first reflective segment 66. The reflected collimated light propagates to the second reflective segment 64, where it is once again reflected and propagates to the collimating means 34. The reflected back collimated light which is propagating with an angle relative to the longitudinal axis of the collimating means 34 is refocused by the collimating means 34 at the input end 48 of the second output fiber 38.

The two input fibers 22, 26 and two output fibers 38, 42 are placed substantially symmetrically relative to the collimating means 34 longitudinal axis. This placement ensures that the collimating means 34 does not mix the optical signal from the first and second input fibers 22, 26 into the first and second output fibers 42, 38.

As illustrated in FIG. 2, the two input fibers and two output fibers are disposed in substantially the same plane, one next to the other forming an optical fiber array. The cladding of the fibers maintains a distance between the cores of these four fibers. The distance between cores of two adjacent fibers is therefore substantially the same.

The ends 44, 48 of the first input 22 and second output 38 fiber are generally arranged with respect to the end surface 32 of the collimating means 34 so that the ends 44, 48, and specifically the optical fiber core, is slightly removed from the longitudinal axis of the collimating means 34. Correspondingly, the ends 46, 50 of the second input fiber 26 and first output fiber 42 are also arranged with respect to the end surface 32 of the collimating means 34 so that each fiber end 46, 50 is also slightly removed from the longitudinal axis of the collimating means 34, and more importantly, so that the two pairs (input/output fiber) of fiber are opposite about the longitudinal axis.

The result is that light from the core of the first input fiber 22 is received by the core of first output fiber 42, the light form the core of the second input fiber 26 is received by the core of second output fiber 38, as the first input/output fibers 22, 38 are opposite to the second input/output fibers 26, 42 relative to the longitudinal axis of the retainer 28. The second reflector 62 reflects light from input fibers 22, 26 into corresponding output fibers 42, 38. Hence, when the first reflector 60 is out of optical path between the collimating means 34 and second reflector 62, the optical signal from the first input fiber 22 is efficiently coupled to the first output fiber 42, while the optical signal from the second input fiber 26 is efficiently coupled to the second output fiber 38.

Figure 3A:
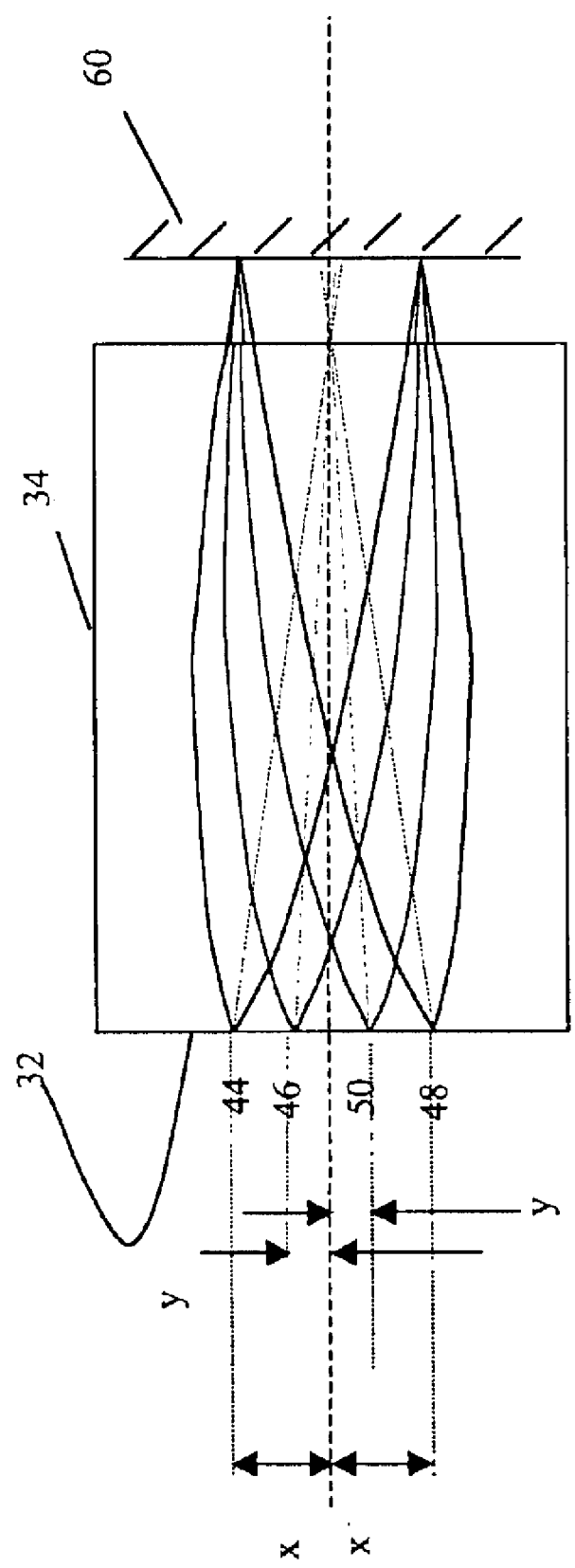
FIG. 3A illustrates the reflection of two input optical signals from two fibers through a collimating lens with the movable reflective element disposed in the optical path defined by the longitudinal axis of the retainer.

As illustrated in FIG. 3A, and apparent to the person skilled in the art, since light passes through the quarter pitch GRIN lens 34 twice, it may be considered as a half pitch GRIN lens which has been split into two equal parts and folded.

FIG. 3A illustrates in more detail how the 2×2 switch arrangement shown in FIG. 1B operates. A point source of light from the output end 44 of a first input optical fiber 22 enters the reciprocally angled face 32 of the quarter pitch GRIN lens 34, slightly off the longitudinal axis of the GRIN lens by distance x. The light propagates through the GRIN lens 34, is reflected by the first reflector 60, and appears at the angled end face 32 of the GRIN lens 34, at a distance x from the longitudinal axis of the GRIN lens, and aligned with the first input end 48 of the second output optical fiber 38.

Similarly, a point source of light from the output end 46 of a second input optical fiber 26 enters the reciprocally angled face 32 of the quarter pitch GRIN lens 34, slightly off the longitudinal axis of the GRIN lens by a distance y. The light propagates through the GRIN lens 34, is reflected by the first reflector 60, and appears at the angled end face 32 of the GRIN lens 34, at a distance y from the longitudinal axis of the GRIN lens, and aligned with the second input end 50 of the first output optical fiber 42.

The light effectively travels from one side of the longitudinal axis to the other side of the longitudinal axis of the GRIN lens 34. The light however has traveled from and returned to the same input surface/face of the GRIN lens 34.

Figure 3B:
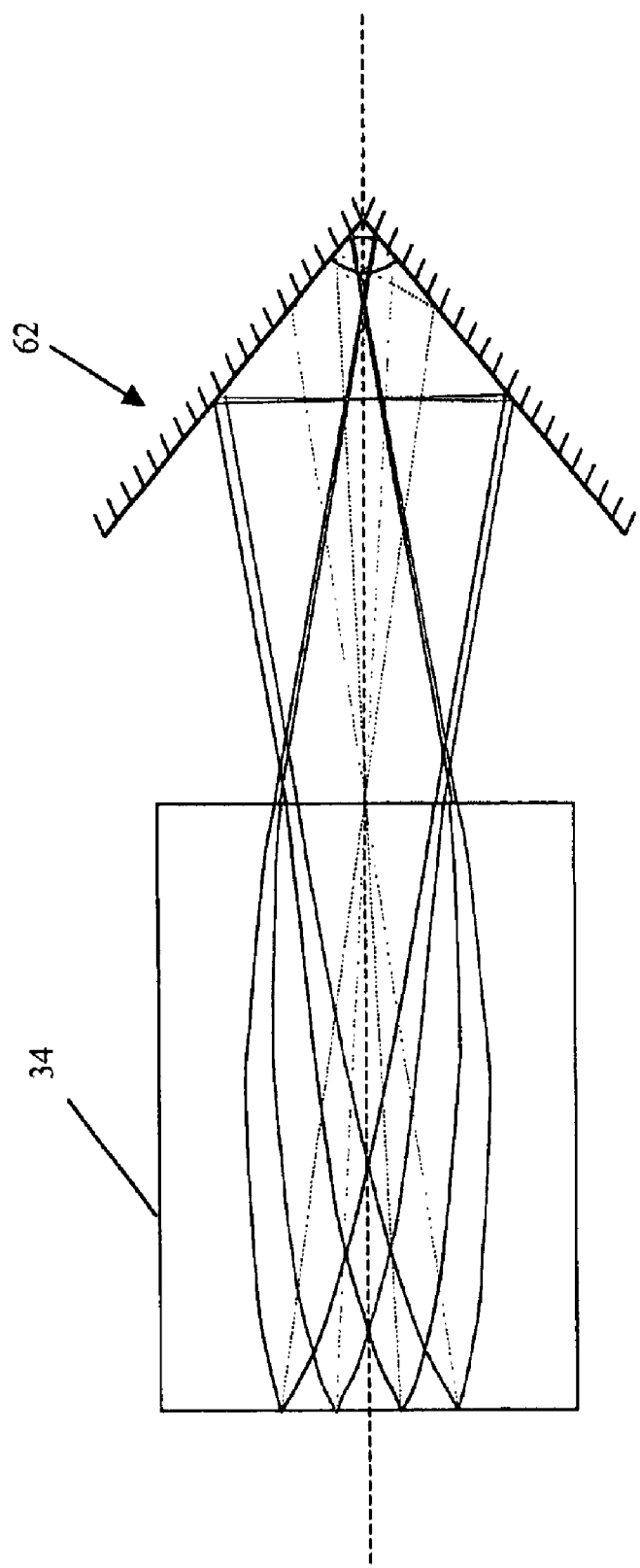
FIG. 3B illustrates the reflection of two input optical signals from two fibers through a collimating lens with the fixed reflective element disposed in the optical path defined by the longitudinal axis of the retainer.
Figure 4:
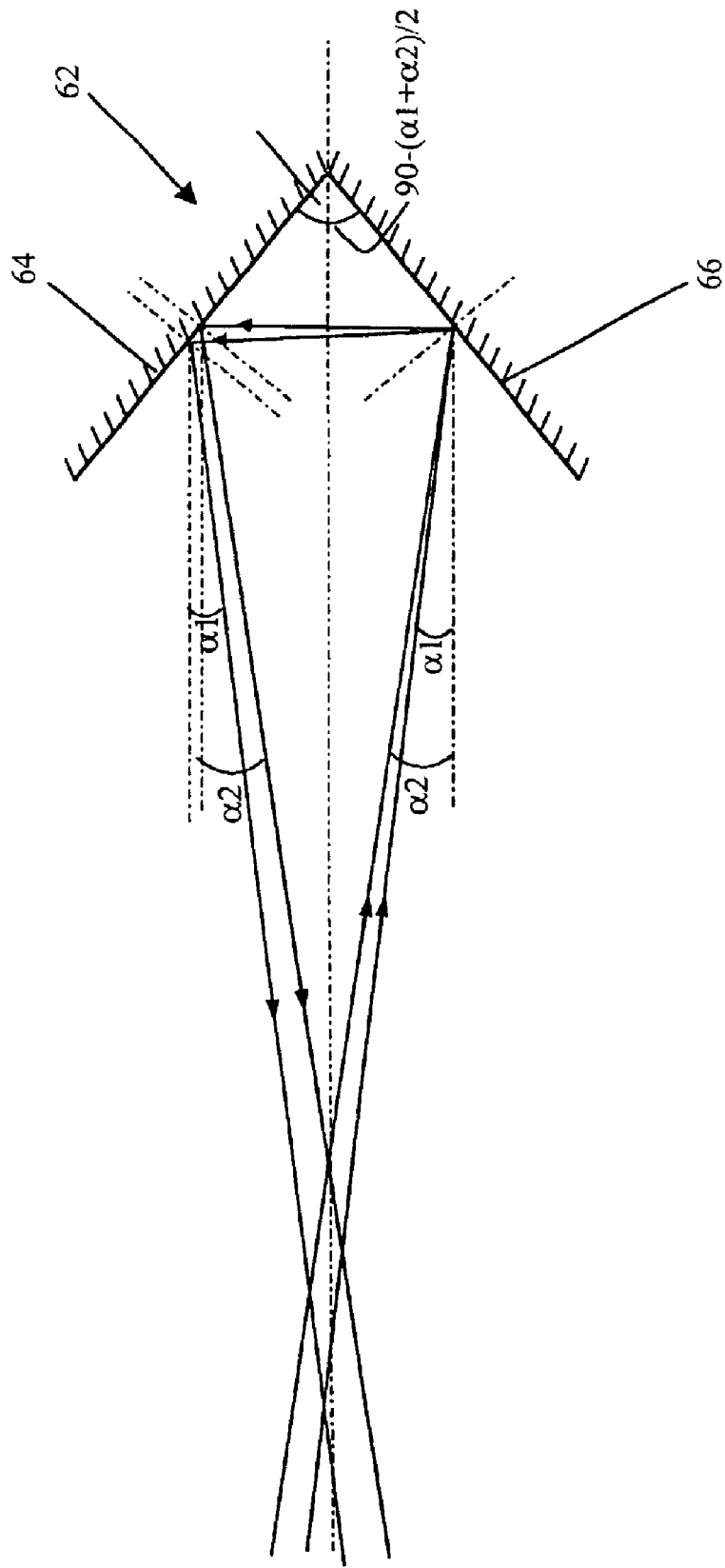
FIG. 4 is a more detailed illustration of the reflection of the optical signals that occurs when the fixed reflective element is disposed in the optical path defined by the longitudinal axis of the retainer.

The operation of the switch shown in FIG. 1, when the moveable mirror is not disposed between the GRIN lens and fixed reflective element may be understood with reference to FIG. 3B and FIG. 4. First with regard to the schematic cross-section of the switch shown in FIG. 3B, the arrangement of optical fibers 22, 26, 38, 42, fiber ends, the retainer 28, collimating means 34, and second reflector 62 need not be moved to effect switching. In fact, the only optical element that moves in the 2×2 switch of FIG. 1, is the first reflector 60. The first reflector 60 comprises a mirror which is generally a small, thin, one-side mirror of conventional construction.

It should be noted that the explanation above of the positions of the fiber ends with respect to the longitudinal axis, as called for by the theoretical operation of the GRIN lens, is an idealization. Empirically, it has been found that fine adjustment may still be required to achieve maximum performance of the switches of the present invention. Nevertheless, the present invention avoids the manufacturing requirements for stringent accuracy of the parallel two-sided mirror architecture of the prior art.

FIG. 4 illustrates the working principle of second reflector 62, the "fixed" reflector. The second reflector comprises two reflective segments 64, 66, for example two flat mirrors that are placed substantially symmetrically to the longitudinal axis of collimating means 34. These two flat mirrors 64, 66 may comprise glass, quartz, or crystal as the substrate. Only one surface of each substrate in the second reflector 62 is required to reflect the light, so this one surface of the substrate is polished well, by any one of a number of methods known in the art. A reflective material is subsequently deposited on this one surface. The reflective materials that are routinely employed for such purposes include, but not are not limited to aluminum, gold, or a multi-layer dielectric coating.

Utilization of an aluminum coating is a relatively low cost option. This type of coating can achieve about 95%~98% reflectivity. The coating is deposited by using vacuum deposition methods, such as high-vacuum evaporation, sputtering, etc. However aluminum coatings exhibit poor performance results when functioning in harsh environments for long periods of time, as required by the communications industry. Furthermore, aluminum coatings can not withstand high power laser beam. If the switch is designed to be hermetically sealed and for use in only low optical power applications, the selection of an aluminum coating is a good candidate for low-cost purposes.

Utilization of a gold coating is a little more expensive. A gold coated mirror can achieve over 98% reflectivity for almost all wavelengths from visible to near infrared, which is the optical communication working wavelength region. The use of a gold coating is known to be reliable for the long term, known to work well in harsh environments and withstand very high power laser beam. The disadvantage is that gold is more difficult to deposit that aluminum. Gold exhibits poor adhesion to most substrates, including glass and crystal. This poor adhesion coating inherently makes the coated element function poorly. To overcome the poor adhesion property of gold, a buffer layer is usually used to improve the adhesive problem. Titanium or Chromium are suitable buffer layer materials as titanium and chromium have adhesive properties to most substrates, including glass, most crystals, and gold.

To make a gold coated mirror, the first step is to deposit a thin titanium or chromium layer on the substrate, the substrate comprising glass or crystal. The thickness of the deposited layer is very thin, preferably less than 100-nm. The second step is to deposit the gold on top of titanium of chromium. The thickness of gold layer will preferably be several microns. Conventional deposition methods include, but are not limited to vacuum deposition, such as evaporation or sputtering. It will be apparent to those skilled in the art that the selected deposition machine is preferably able to accomplish both the deposition of the titanium or chromium and the deposition of the gold, such that both layers can be deposited without interrupting the vacuum environment. Such as machine is known as a two target deposition machine.

Selection of a multi-layer dielectric mirror provides for a high performance mirror. The reflectivity that can be achieved can be as high as 99.9%, by using a multi-layer quarter wavelength design. Multi-layer dielectric coatings are known to withstand very high power optical beams and be able to function under substantially harsh environmental conditions. The overall performance of a multi-layer dielectric mirror is conventionally higher than a gold-coated mirror. However, the disadvantage of this type of mirror is that it is wavelength selective. The working wavelength region of a typical multi-layer dielectric coating is in the region of 100 nm. This means that if the wavelength falls out of the design region, the device cannot be used effectively, or the device shows very poor performance, such as exhibiting high insertion loss and high crosstalk. To usefully employ the multi-layer dielectric, one needs to deposit more than 10-quarter wavelength layers, the layers comprising alternating layers of high and low refractive indexed material. As for the other layers, the multi-layer dielectric coating can be provided utilizing vacuum deposition technologies, such as high-vacuum evaporation, sputtering, etc. However, a two target deposition system is required for such serial coating, and the multilayer architecture inherently means that it takes a longer time to manufacture a multi-layer dielectric mirror than it does to produce a Gold or aluminum coated mirror.

To function effectively, it is desirable that each of two reflective segments 64, 66 comprise a precisely polished edge. The edge of the substrate of the flat mirror is polished precisely to an angle equal to $45-(\alpha 1+\alpha 2)/4$. Subsequently, the two flat mirrors are disposed as indicated in FIG. 4. As illustrated, the wedge angles of two reflective segment 64, 66 are against each other, forming a combined angle of $90-(\alpha 1+\alpha 2)/2$.

An adhesive, preferably an epoxy is used to glue these two mirrors together. Suitable adhesives include, but are not limited to thermal epoxy, uv-epoxy, or gold welding. The technique utilized to adhere the two mirrors together is fundamental to the present invention. The adhesive layer is preferably very thin, in the range of a micrometer such that the addition of the adhesive layer will not alter the angle of this fixed reflective element. On the other hand, the bond of two reflective segments 64, 66 needs to be very strong and reliable. In addition, the adhesive layer is thin enough that it does not cause any unwanted optical signal reflections to occur.

Alternatively, the second reflector 62 can be adhered into a mount directly, the mount providing support and alignment for each discrete reflective segment 64, 66 and the combined second reflector 62. The mount facilitates the second reflector 62 to be robust.

Figure 5:
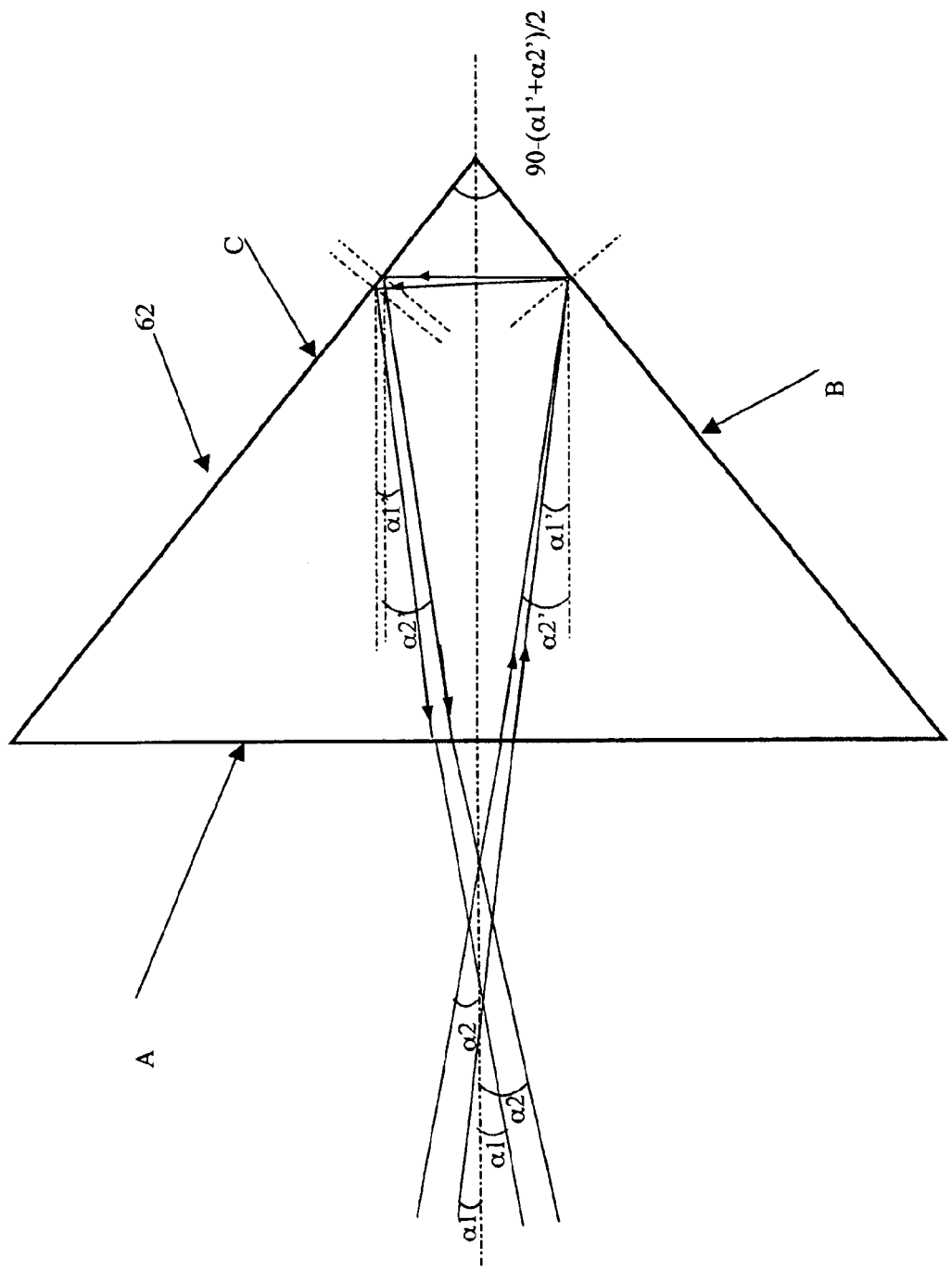
FIG. 5 illustrates the reflection of the optical signals in an alternative fixed reflective element, in the form of a prism.

An alternative technology that can be utilized to produce a fixed reflective element is prism technology. As illustrated in FIG. 5. It is possible to provide a second reflector 62 in the form of a prism with angle equal to $90-(\alpha 1'+\alpha 2')/2$. Current manufacturing technology facilitates the provision of a prism with very precise angles, ±1 mrad. The prism approach is more robust then the conventional mirror approaches mentioned above. The prism can comprise glass, quartz, or crystal as substrate. The refractive index of prism material is preferably a little higher than 1.5 to ensure the total reflection performance. The front surface of the substrate preferably includes an anti-reflection coating. The anti-reflection (AR) thin film utilizes dielectric coating technology that is known to those skilled in the art. 2~4 layers AR coating can give acceptable performance with less than 0.25% reflection over a wide wavelength region (several hundred nanometers).

The light exits from collimating means 34 with an angle of $\alpha 1$ relative to the longitudinal axis of the collimating means 34, and propagates to the front interface A of the prism. This light then changes its propagation angle to $\alpha 1'$ relative to the longitudinal axis of the collimating means 34, the change encountered depending upon the refractive index of prism material. The relation between $\alpha 1$ and $\alpha 1'$ is as follows, $$\sin \alpha 1 = n \sin \alpha 1'$$

$$\sin \alpha 2 = n \sin \alpha 2'$$

The light continues to propagate to surface B of the prism with an incident angle of $(45-[3\alpha 1-\alpha 2']/4)$. This incident angle will be greater than critical angle of prism material so that the light will be totally reflected at surface B. The light then propagates onto surface C of the prism with an incident angle of $45-(3\alpha 2'-\alpha 1')/4$. Once again, this angle is greater than critical angle of the prism material. The light is reflected a second time and propagates at an angle of $\alpha 2'$ relative to the longitudinal axis of the collimating means 34. The light will finally exit surface A of the prism again and change the propagation angle from $\alpha 2'$ to $\alpha 2$ in air as shown in above equation.

Similarly, the light exits from collimating means 34 with angle $\alpha 2$ relative to the longitudinal axis of the collimating means 34, and propagates to the front interface A of the prism. The light then changes its propagation angle to $\alpha 2'$ relative to the longitudinal axis of the collimating means 34, following the above equation. Then the light continues to propagate to surface B of the prism with an incident angle of $45-(3\alpha 2'-\alpha 1')/4$. This incident angle will be greater than critical angle of prism material so that the light will be totally reflected at surface B. The light then propagates onto surface C of the prism with incident angle of $45-(3\alpha 1'-\alpha 2')/4$. Once again, this angle is greater than critical angle of prism material. The light is reflected a second time and propagates at an angle along the direction with angle $\alpha 1'$ relative to the longitudinal axis of the collimating means 34. The light will finally exit surface A of the prism again and change the propagation angle from $\alpha 1'$ to $\alpha 1$ in air as shown in above equation.

Figure 6:
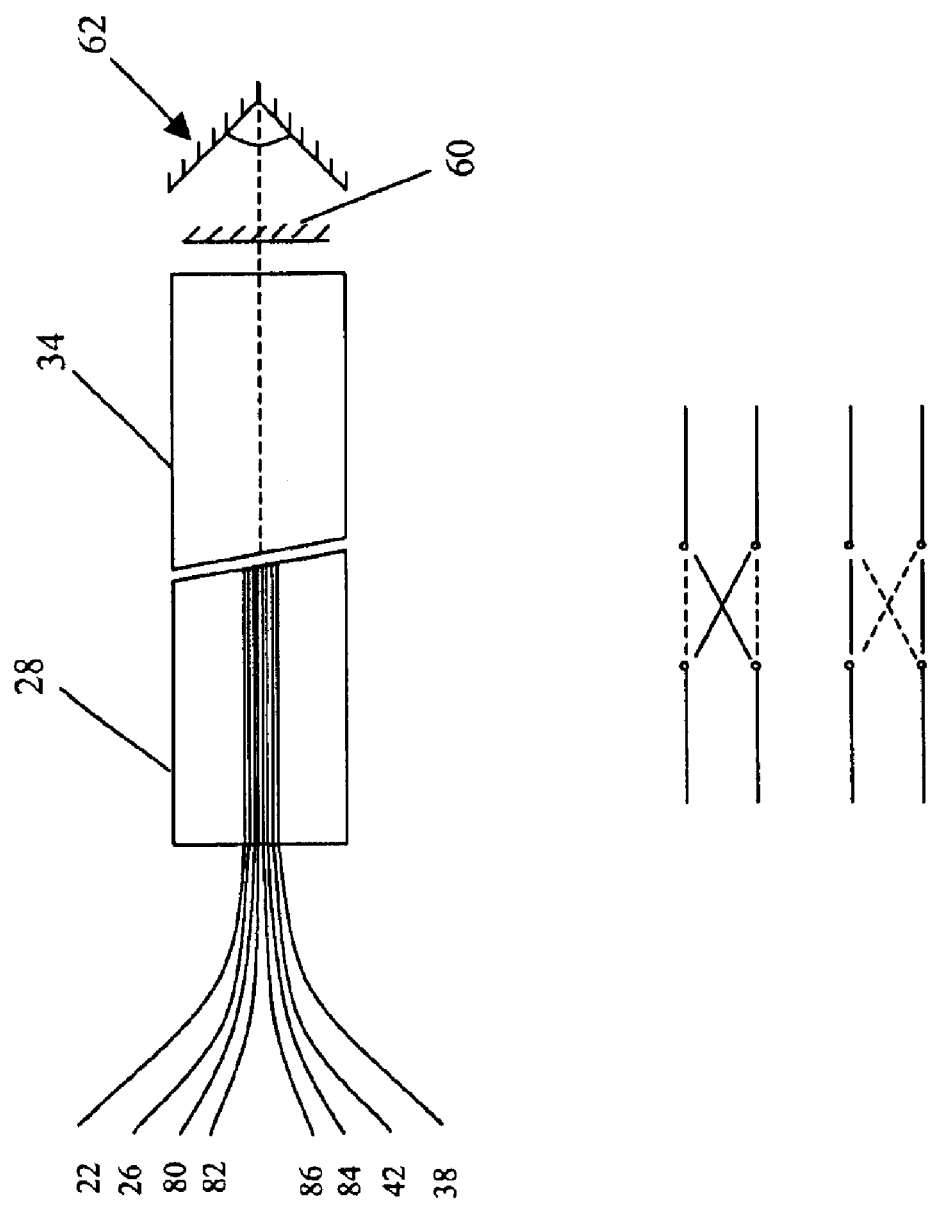
FIG. 6 schematically illustrates an alternative electromechanical optical switch in which a movable reflective element and fixed reflective element provide simultaneous dual 2×2 switching.

Referring now to FIG. 6, an alternative embodiment of a dual 2×2 electromechanical optical switch includes a structure similar to that of the single electromechanical optical switch described above, but here uses an eight-fiber retainer 28 which holds in addition a third input fiber and a fourth input fiber, as well as a third output fiber and a fourth output fiber, instead of a four-fiber retainer. The coupling of the first and second input and output fibers using the first reflector 60 is as described above regarding a single 2×2 switch. Additionally, a third optical signal from a third input channel

80 is reflected by the first reflector 60 to a third output channel 84. Similarly, a fourth input signal from a fourth input channel 82 is coupled by the first reflector 60 to the fourth output channel 86.

Figure 7:
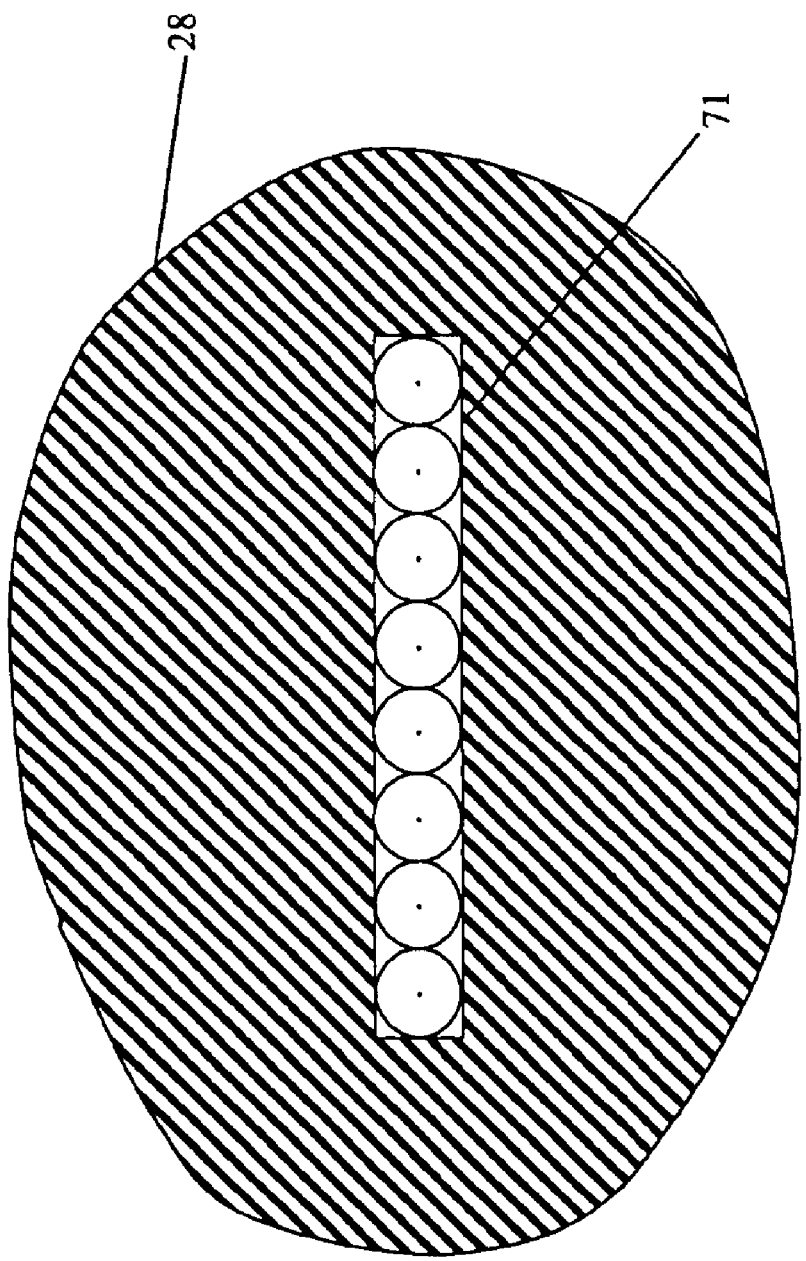
FIG. 7 illustrates a planar arrangement of four input and four output optical fibers within an aperture of a retainer for the switch arrangement shown in FIG. 6.

When the first reflector 60 is removed from between the collimating means 34 and second reflector 62, the first optical signal from first input channel 22 is coupled to the fourth output channel 86, while the second signal from the second input channel 26 is propagated to the third output channel 84. Simultaneously, the third signal from the third input channel 80 propagates to the second output channel 42, while the fourth signal from the fourth input channel 82 is focused upon the first output channel 38. Those with skill in the art will recognize that a wide variety of alternative switching arrangements could be provided by the switches of the present invention. In this embodiment, all four input fibers and four output fibers are disposed within a eight-fiber retainer 28 having a rectangular aperture along its longitudinal axis, as illustrated in FIG. 7. The width of this slot is 125 microns that just allows a standard fiber to go through. The length of the opening slot is one millimeter such that it accommodates eight fibers linearly.

It will be apparent to those skilled in the art that the utilization of a planar linear array of optical channels facilitates integration of the device. The device lends itself to an arrangement whereby the optical channels may be transformed from optical fiber to optical channels in a planar waveguide array simply, thereby facilitating ease of manufacture.

If additional functions are required to be integrated into the switch, fiber optic elements can be easily inserted into the optical path between the quarter pitch GRIN lens and first reflector 60 of the switches of FIGS. 1A and 1B. For example, wavelength-division multiplexed switches may be provided by replacing the first reflector 60 with a partially reflective filter.

While the description above provides a full and complete disclosure of the preferred embodiments of the present invention, various modifications, alternate constructions, and equivalents will be obvious to those with skill in the art. Thus the scope of the present invention is limited solely by the appended claims.

What is claimed is:

1. A method for switching optical signals, the method comprising:

(a) transmitting a first optical signal along a first optical path from a first input channel;

(b) transmitting a second optical signal along a second optical path from a second input channel;

(c) transmitting a third optical signal along a third optical path from a third input channel, (d) transmitting a fourth optical signal along a fourth optical path from a fourth input channel, (e) collimating the first, second, third and fourth optical signals from the first, second, third and fourth optical paths with a collimator;

(f) moving a first reflector to a first position such that the first optical signal is reflected by a second reflector through the collimator and refocused into a first output channel, the second optical signal is reflected by the second reflector through the collimator and refocused into a second output channel, the third optical signal is reflected by the second reflector through the collimator and refocused into a third output channel, and the fourth optical signal is reflected by the second reflector through the collimator and refocused into a fourth output channel; and (g) moving the first reflector to a second position such that the first optical signal is reflected back through the collimator by the first reflector, such that the collimator re-focuses the first signal into the fourth output channel, the second optical signal is reflected by the first reflector back through the collimator, such that the collimator re-focuses the second signal into the third output channel, the third optical signal is reflected back through the collimator by the first reflector, such that the collimator re-focuses the third signal into the second output channel, and the fourth optical signal is reflected by the first reflector back through the collimator, such that the collimator re-focuses the fourth optical signal into the first output channel.

2. The method of claim 1, wherein the second reflector comprises two reflector segments making an angle of less than 90 degrees relative to one another.

3. The method of claim 2, wherein the two reflector segments are faces of a prism.

* * * * *